Patented Mar. 6, 1951

2,544,164

UNITED STATES PATENT OFFICE 2,544,164

2-BROMOTHIOPHENE

Carl E. Johnson and George M. Wagner, St. Louis, Mich., assignors to Michigan Chemical Company, St. Louis, Mich., a corporation of Michigan No Drawing. Application November 24, 1947, Serial No. 787,864

6 Claims. (Cl. 260—329)

The present invention relates to a novel process for the bromination of thiophene, and is more particularly concerned with a process for the direct bromination of thiophene with the production of high yields of 2-bromothiophene.

It has previously been proposed to produce bromothiophenes from thiophene by various procedures. The best of these procedures reported in the literature is that of Blicke and Burckhalter, J. Am. Chem. Soc. 64, 478–479, (1942), who reported the preparation of 2-bromothiophene in yields as high as 55 per cent by the bromination of thiophene in large quantities of carbon tetrachloride as solvent. However, the large quantity of solvent required for this process seriously limits the production capacity of any given reactor, and also involves extensive recovery and purification of large quantities of solvent and unconverted thiophene. Furthermore, unreacted thiophene dissolved in the solvent cannot be recovered readily without serious solvent losses, and recycling of crude recovered solvent impairs the efficiency of the process considerably.

Other procedures have also been employed by prior investigators seeking to prepare 2-bromothiophene, such as the employment of acetic acid as solvent. 2-bromothiophene has been prepared from the dibromo derivative by decomposition of the Grignard reagent thereof with aqueous hydrochloric acid. The direct bromination of thiophene has been attempted, but has produced only small yields of the desired 2-bromothiophene, and a preponderance of the 2,5-dibromothiophene derivative in the quantity of brominated products which was obtained. No method for the satisfactory commercial preparation of 2-bromothiophene has been available up to the present time.

It is, therefore, an object of the present invention to provide a novel method for the direct bromination of thiophene. A further object of the present invention is the provision of a novel method for the direct bromination of thiophene whereby 2-bromothiophene may be obtained in high yield with the elimination of substantial quantities of byproducts other than 2,5-dibromothiophene. A further object of the invention is the provision of a novel process for the bromination of thiophene by the introduction of bromine vapor thereinto. An additional object is the provision of a novel method for the bromination of thiophene to produce high yields of 2-bromothiophene in larger amount per any given reactor and in a shorter period of time, by a procedure which involves fewer operational steps than any previous synthesis, in addition to allowing recovery of unreacted thiophene. Other objects of the invention will become apparent hereinafter.

The method of the present invention essentially comprises contacting bromine vapor with thiophene at reflux or a temperature below the boiling point of the reaction mixture. Definite advantages have been found to accrue to the employment of preheated bromine vapor, i. e., bromine vapor preheated to a temperature somewhat above its boiling point; to the employment of a contact or reaction temperature above about 20 degrees centigrade; and to the employment of between about 30 and 70 per cent of the amount of bromine theoretically required for the production of 2-bromothiophene. Generally speaking, however, the present invention broadly comprises the reaction between bromine, in the vapor phase, and thiophene, in the liquid phase.

Bromine is ordinarily a liquid at room temperature, having a melting point of −7.2 degrees centigrade and a boiling point of about 58.78 degrees centigrade. Thiophene, on the other hand, is also a liquid at room temperature, having a melting point of −30 degrees centigrade and a boiling point of about 84 degrees centigrade. It is therefore possible to have bromine in the vapor phase and to have thiophene in the liquid phase, i. e., at a temperature below about 84 degrees centigrade, while yet having these reactants at about the same temperature. It is this factor which allows the method of the present invention to be carried out with the production of the desired 2-bromothiophene in unprecedented yields. Alternatively, the bromine may be vaporized by passage of an inert gaseous diluent therethrough, while the bromine is at a temperature below its boiling point.

The reagents employed should be of good quality, the bromine preferably being treated with dried silica gel to remove all free moisture, although this is not a necessity. The thiophene employed is advantageously dried over calcium chloride or sodium hydroxide pellets, and any diluents, if employed, may be obtained from cylinders of commercial grade material and dried by passing the diluent through a calcium chloride drying tube or a drying means of other conventional type.

The apparatus employed in carrying out the reaction may be of any convenient and desirable type. For example, the thiophene may be maintained in a three-neck flask equipped with stirrer, bromine inlet, and a condenser leading from the flask. The bromine may be admitted into a bromine vaporizer in measured quantity by means of a dropping funnel or other suitable inlet, and passed from the vaporizer by a heated delivery tube below the surface of the thiophene in the flask. The condenser leading from the flask may be in an upright position, and may be connected to a second condenser also in an upright position which is so designed to return organic product to the flask and to allow gases, e. g., hydrogen bromide, to pass into a scrubbing system. The provision of the auxiliary downward condenser is somewhat advisable, since a considerable quantity of thiophene may be swept over by evolving hydrogen bromide, and an arrangement for the return of thiophene to the reaction vessel from the downward condenser is in this way advantageous. When it is desired to employ an inert diluent, it is only necessary that the diluent be passed through a dryer, flow meter, and then introduced into the bromine line between the bromine vaporizer and the reaction flask, or that the diluent be bubbled through liquid bromine.

The reaction may be conveniently carried out by cooling or heating the reactor to the desired temperature, and then starting the diluent gas and bromine into the liquid thiophene. In experiments not employing a diluent, it is only necessary that the bromine be introduced as a preheated vapor. After all bromine has been added, an inert diluent, if employed, may be passed through the thiophene until hydrogen bromide evolution ceases. When no diluent is employed, refluxing the mixture of reaction products for a sufficient period of time, e. g., fifteen minutes, is usually sufficient to drive off any remaining hydrogen bromide.

The most advantageous manner of conducting the reaction is as follows: The reaction vessel is charged with thiophene and heated to a temperature of approximately 75 degrees centigrade. The bromine vapor is added to the mixture below the surface thereof over a period of six to eight hours, and the reaction temperature allowed to rise to approximately 85 to 95 degrees centigrade during this period. After all the bromine is added, the mixture of reaction products is maintained at reflux temperature for about one-half to one hour to remove any remaining hydrogen bromide. The crude reaction product is then fractionally distilled, to yield the individual reaction products, including the desirable 2-bromothiophene in yields as high as 77 per cent based on the thiophene, and 75 per cent based on the bromine employed.

The vaporized bromine may be introduced into the thiophene separately or together with an inert diluent, such as air, sulfur dioxide, or nitrogen. In any case, it is advantageous to preheat the bromine before introducing it into the thiophene. It has been found that the employment of a diluent, in the absence of preheating the bromine, is not as satisfactory a procedure as the employment of preheated bromine vapor alone. However, if it is desired to employ a diluent, the preferred reaction conditions are a relatively high temperature, e. g., between about 50 and 95 degrees centigrade, and preferably at or near the reflux temperature of the reaction mixture; from 30 to 70 per cent of the theoretical quantity of bromine; and, a diluent rate (volume of diluent per volume of bromine vapor) approximately equal to two to four times the bromine rate, and a figure at least greater than one.

The procedure, wherein a gaseous diluent is employed, gives distinct advantage over any process previously described, and maximum yields of 2-bromothiophene of approximately 50 to 56 per cent may be obtained thereby, even without preheating of the bromine. Liquid diluents are eliminated, unreacted thiophene can be readily recovered, and there is no large volume of solvent which is inconvenient to handle. The overall effect is a substantial reduction in the cost of 2-bromothiophene. The only apparent disadvantage in the process is the fact that thiophene may be swept by the gaseous diluent out through the reflux condenser, and, while a portion of the thiophene is condensed in the hydrogen bromide scrubber, some of it is nevertheless carried through into the atmposphere and is lost.

A still more effective manner of carrying out the present invention is with the employment of preheated bromine vapor alone, in the absence of a diluent. It is by operation according to this mode of the invention that the highest yields of desired 2-bromothiophene, 70 to 75 per cent of theory based on the bromine and 74 to 77 per cent based on the thiophene, may be realized. This would indicate that the main factor contributing to the high yields of 2-bromothiophene was the preheating of the bromine vapor, and that the employment of a diluent was ancillary. The main advantage of a diluent, therefore, lies in the fact that it may be employed successfully with the bromine when it is desired to obviate preheating of the bromine. High temperatures favor better yields of 2-bromothiophene, and this might conceivably be due to the fact that the point of contact of the heated bromine vapor and the thiophene was at a temperature possibly well above that of the reaction mixture as a whole. This would expel the evolved hydrogen bromide more rapidly from the reaction mixture, in which case the hydrogen bromide would have little opportunity to form addition compounds with thiophene and bromothiophenes, or to rupture the thiophene nucleus. This type of situation would also favor formation of increased yields of the mono- and dibromo derivatives. While it is not desired to limit the invention by any discussion of the exact mechanism concerned, it may be stated simply that reactions conducted at a temperature above about 60 degrees centigrade are preferred, and especially temperature of 80 degrees or higher, including the reflux temperature of the reaction mixture and slightly above. In any mode of operation, the preferred temperature is as indicated above, and the amount of bromine employed is less than that theoretically required to convert the thiophene to 2-bromothiophene, preferably between about 30 and 70 per cent of that theoretically required for the production of 2-bromothiophene, and most advantageously about 60 per cent of the theoretical amount. The bromine is advantageously preheated, the temperature of preheating being at least above its boiling point of approximately 58 degrees centigrade.

The following table indicates the effect of the reaction temperature, the reaction being conducted in each case with the employment of an inert diluent and in the absence of the preheating of the bromine:

| Exp. | Diluent | Temp., °C. | Yield 2-Bromothiophene, Per Cent Theory |
|---|---|---|---|
| 1 | $SO_2$ | 0 | 26.9 |
| 2 | do | 25 | 40.5 |
| 3 | Air | 25 | 41.4 |
| 4 | do | 50 | 45.5 |
| 5 | do | 50 | 45.0 |
| 6 | do | 80 | 58.1 |
| 7 | do | 80 | 55.9 |
| 8 | do | 80 | 56.6 |

The effect of diluent rate is illustrated by the following table, the temperature employed being 80 degrees centigrade.

| Exp. | Diluent Rate, Vol. air/Vol. Br. Vapor | Diluent | Yield 2-Bromothiophene, Per Cent Theory |
|---|---|---|---|
| 1 | 5 | Air | 52.6 |
| 2 | 1 | do | 48.4 |
| 3 | 2 | do | 47.6 |
| 4 | 2 | do | 53.1 |
| 5 | 3 | do | 51.8 |
| 6 | 4 | do | 55.9 |
| 7 | 4 | N₂ | 57.2 |
| 8 | 8 | Air | 56.2 |

The table below illustrates the effect of varying the amount of bromine introduced into the reaction at a temperature of 80 degrees centigrade. The results indicate that bromine in the amount between about 30 and 70 per cent of the theoretical is preferable, due to increased production of 2-bromothiophene per batch, and maximum yields based on the bromine employed. The last experiment was carried out with mechanical agitation and shows a higher yield than the similar experiment conducted without agitation, but other results indicate that very little effect is produced by agitation over the results produced with no agitation.

| Exp. | Per Cent of Theoret. Br. | Diluent | Yield, 2-bromothiophene, Per Cent Theory |
|---|---|---|---|
| 1 | 30 | Air | 56.0 |
| 2 | 60 | do | 56.6 |
| 3 | 80 | do | 48.0 |
| 4 | 80 | do | 54.5 |

The following series of experiments in tabular form shows the optimum conditions for the method of the present invention when preheated bromine vapor is employed, and indicates a reaction temperature of 80 degrees centigrade or higher with employment of 60 per cent of the bromine theoretically required to produce 2-bromothiophene as most desirable conditions.

| Exp. | Diluent | Per Cent Theoret. Br. | Reaction Temp., °C. | Yield 2-bromothiophene, Per Cent Theory | Per Cent of residue, B. P. below 210° C. mainly 2,5-dibromothiophene |
|---|---|---|---|---|---|
| 1 | Air | 60 | 80 | 70.4 | |
| 2 | None | 60 | 20 | 70.5 | 48.6 |
| 3 | do | 60 | 60 | 71.3 | 74.4 |
| 4 | do | 60 | 80 | 75.0 | 92.8 |
| 5 | do | 60 | 80+ | 72.3 | 85.6 |

The following example is given to illustrate the practice of the invention and is in no way to be construed as limited:

Bromine (340 pounds) was vaporized and bubbled into thiophene (298 pounds) maintained at a temperature of 75 degrees centigrade. The bromine vapor was added over an eight-hour period. This quantity of bromine was 60 per cent of that theoretically required to convert all of the thiophene to 2-bromothiophene. After bromine addition was complete, the product was refluxed for two hours to remove hydrobromic acid. The product had a volume of 36.5 gallons and a specific gravity of 1.510 at 20 degrees centigrade. The product was fractionally distilled and yielded 281.9 pounds of 2-bromothiophene and 44.5 pounds of 2,5-dibromothiophene.

Various modifications may be made in carrying out the method of the present invention without departing from the spirit or scope thereof, and it is to be understood that we limit ourselves only as defined in the appended claims:

We claim:

1. The process which includes: preheating bromine to a temperature of at least about 58 degrees centigrade, vaporizing the preheated bromine, and introducing the preheated vaporized bromine into liquid thiophene, the amount of bromine employed being between about 30 and 70 per cent of that theoretically required to convert the thiophene to 2-bromothiophene, at a reaction temperature above about 20 degrees centigrade, and separating 2-bromothiophene from the reaction product.

2. The process which includes: preheating bromine to a temperature above its boiling point, and introducing the vaporized bromine into liquid thiophene, the amount of bromine employed being between about 30 and 70 per cent of that theoretically required to convert the thiophene to 2-bromothiophene, at a reaction temperature above about 60 degrees centigrade; and separating 2-bromothiophene from the reaction product.

3. The process which includes: preheating thiophene to a temperature above about 50 degrees centigrade and introducing bromine, preheated to a temperature above its boiling point, into the preheated thiophene in an amount between about 30 and 70 per cent of that theoretically required to convert the thiophene to 2-bromothiophene, and maintaining the temperature of the reaction zone between about 60 degrees and the reflux temperature of the mixture.

4. The process of claim 3, wherein the bromine is introduced in an amount of about 60 per cent of the theoretical required to convert the thiophene to 2-bromothiophene.

5. The process of claim 3, wherein the temperature of the reaction zone is maintained above about 80 degrees centigrade.

6. The process which includes: preheating bromine to a temperature of at least about 58 degrees centigrade, vaporizing the preheated bromine, and introducing the preheated vaporized bromine into liquid thiophene, the amount of bromine employed being less than that theoretically required to convert the thiophene to 2-bromothiophene, at a reaction temperature above about 20 degrees centigrade, and separating 2-bromothiophene from the reaction product.

CARL E. JOHNSON.
GEORGE M. WAGNER.

REFERENCES CITED

The following references are of record in the file of this patent:

Groggins, "Unit Processes in Organic Synthesis," Ed. 2, McGraw Hill, N. Y., 1938, pp. 200, 220, 221, 222.

Houben, "Die Methoden des Organischen Chemie," pp. 1128 and 1149, Edwards Lithoprint, 1943 (1930 copyright), vol. 3.

Steinkopf, "Die Chemie Des Thiophens," page 42, Edwards Lithoprint, 1944 (1941 copyright).

Morton, "The Chemistry of Heterocyclic Compounds," p. 42, McGraw Hill, New York, 1946.